United States Patent [19]

Policella

[11] Patent Number: 4,912,825

[45] Date of Patent: Apr. 3, 1990

[54] AUTOMOTIVE VALVE LIFTER AND PUSH ROD EXTRACTOR TOOL

[76] Inventor: Henry Policella, 108-A Oregon Ave., Bronxville, N.Y. 10708

[21] Appl. No.: 300,312

[22] Filed: Jan. 23, 1989

[51] Int. Cl.[4] .............................................. B23P 19/04

[52] U.S. Cl. ..................................................... 29/214

[58] Field of Search ................ 29/213.1, 214.260, 259, 29/263, 264, 261, 266, 256, 426.5

[56] References Cited

U.S. PATENT DOCUMENTS

| | | | |
|---|---|---|---|
| 1,595,246 | 8/1926 | Ragsdale | 29/214 |
| 3,837,060 | 9/1974 | Stehling | 29/256 |
| 3,846,891 | 11/1974 | Elg | 29/261 |
| 4,305,193 | 12/1981 | Anderson | 29/263 |
| 4,372,023 | 2/1983 | Costoe | 29/266 |

FOREIGN PATENT DOCUMENTS

| | | | |
|---|---|---|---|
| 463762 | 3/1950 | Canada | 29/259 |

*Primary Examiner*—Robert C. Watson
*Attorney, Agent, or Firm*—Richard L. Miller

[57] ABSTRACT

This valve lifter and push rod extractor tool is designed to quickly and easily remove hydraulic valve lifters and push rods in automobile engines without removing the engine head from the engine block. The device utilizes the existing thread bores on the engine which normally secure the valve cover in place to mount the tool temporarily on the engine head. The device has a mechansim which is able to reach into awkward spaces in the engine with a clamp apparatus that can be temporarily attached to a valve lifter or push rod and then produce a sufficient pulling removal force which can be applied to either part until it comes free from the engine.

8 Claims, 1 Drawing Sheet

AUTOMOTIVE VALVE LIFTER AND PUSH ROD EXTRACTOR TOOL

BACKGROUND OF THE INVENTION

The instant invention relates generally to automotive vehicle tools, and more particularly, to an automotive valve lifter and push rod extractor tool.

Numerous automotive engine tools have been provided in the prior art that are adapted to be employed in removing parts. While these units may be suitable for the particular purpose to which they address, they would not be as suitable for the purpose of the present invention as hereafter described.

SUMMARY OF THE INVENTION

A primary object of the present invention is to provide an automotive valve lifter and push rod extractor tool that will overcome the shortcomings of the prior art devices.

Another object is to provide an automotive valve lifter and push rod extractor tool that will be of such design, as to easily extract hydraulic valve lifters and push rods in automotive engines without the engine head being removed from the engine block.

An additional object is to provide an automotive valve lifter and push rod extractor tool that will firmly grip a valve lifter or push rod, so as to extract same by a handle on the tool.

A yet additional object is to provide an automotive valve lifter and push rod extractor tool that is constructed in such a manner so that it lends it self to being used in a wide range of types of engines rather, than only to a particular specific engine.

A further object is to provide an automotive valve lifter and push rod extractor tool that is simple and easy to use.

A still further object is to provide an automotive valve lifter and push rod extractor tool that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figures 1, 2, 3, 4, 5, 6, 7:
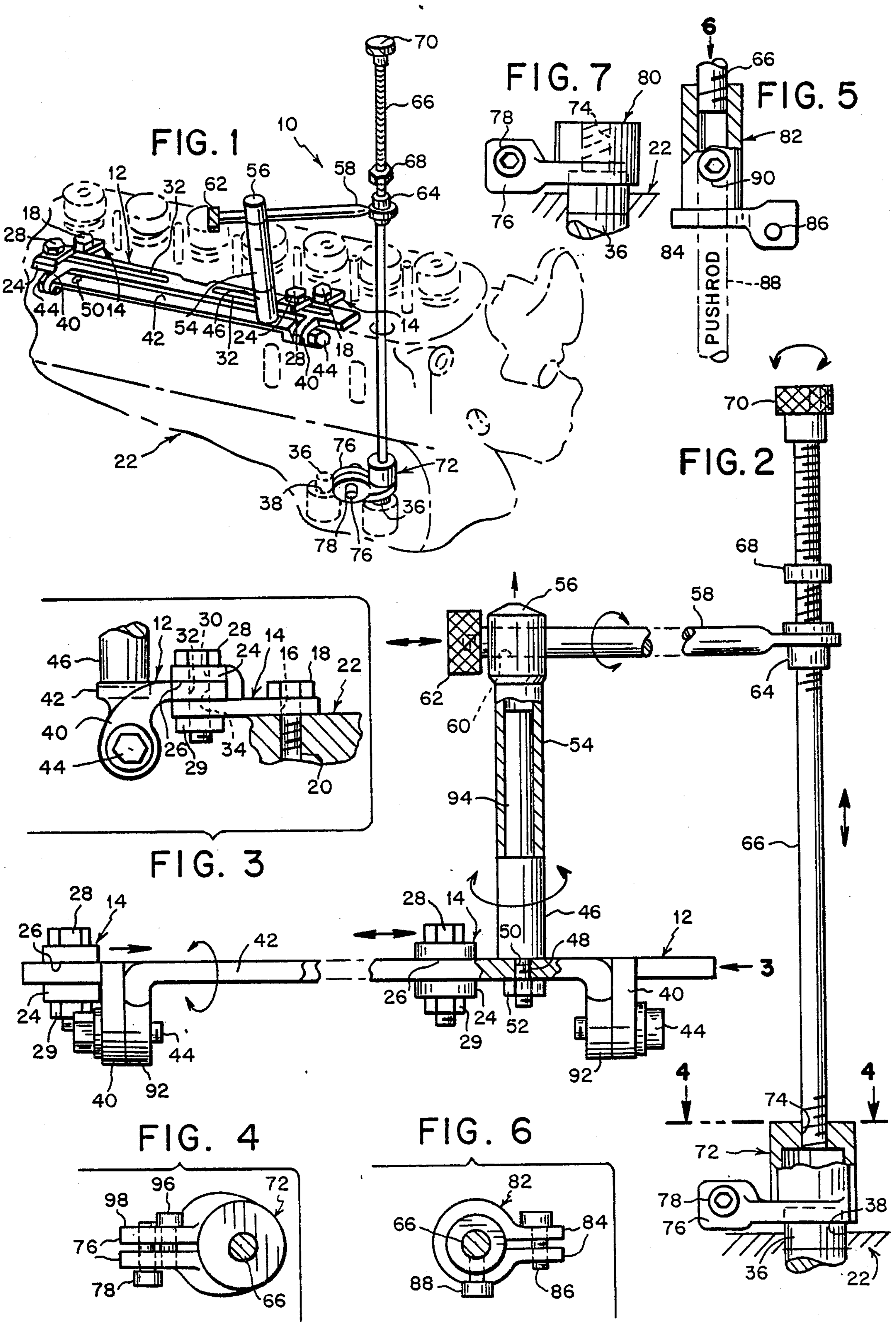
FIG. 1 is a fragmentary diagrammatic perspective view of the instant invention shown in operative use with an engine in the background shown in phantom.
FIG. 2 is a side elevational view of the invention shown with parts broken away.
FIG. 3 is a view taken in the direction of arrow 3 of FIG. 2.
FIG. 4 is a cross sectional view taken on line 4—4 of FIG. 2.
FIG. 5 is a partial cross sectional fragmentary side elevational view of a modified clamp element showing in phantom a push rod therein.
FIG. 6 is a view taken in the direction of arrow 6 of FIG. 5.
FIG. 7 is a side elevational view of an additional valve lifter short adapter for the invention.

Turning now descriptively to the drawings, in which like reference characters denote like elements throughout the several views, a tool 10 is shown to include a mounting bar 12 which has a pair of elongated cut-out openings 32 which are fitted with a pair of slideable securement brackets 14 that have openings 16 therethrough for receiving bolt fasteners 18 that thread into openings 20 that exist in the top portion of an automotive engine 22. The other ends of brackets 14 are provided with a fork 24 fixedly secured thereto, and the openings 26 of the fork 24 freely receive mounting bar 12. A bolt fastener 28 is freely received in an opening 30 of the fork 24 and an elongated cut-out opening 32.

Bolt fasteners 28 receive nut fasteners 29 which serve to tighten mounting bar 12 in any desired position frontwardly and rearwardly to operate tool 10 to extract a valve lifter 36 from its opening 38 in engine 22, as illustrated in FIGS. 1, 2, and 7 of the drawing.

A pair of spaced apart projections 40 are provided and extend from one edge of mounting bar 12. Projections 40 are integrally attached to mounting bar 12 for pivotally mounting a second bar 42 parallel to mounting bar 12. Second bar 42 has ear ends 92 and these ends are received between projeetions 40 and are pivotally held thereto by a pair of bolt fasteners 44. A post 46 is provided and includes an integrally attached threaded stud 48 that is received in an endward opening 50, in a first end. A nut fastener 52 is received on the stud 48 for securing post 46 vertically to the second bar 42.

The second end of post 46 has an integrally joined reduced shank portion 94.

A mounting sleeve 54 is provided and is freely rotatable and removably received on reduced shank portion 94 of post 46, and sleeve 54 includes an integrally attached head 56 that slideably receives a first rod 58 through a transverse opening 60 through head 56. A first end of first rod 58 threading receives a knurled knob 62 so as to inadvertently prevent first rod 58 from being separated from head 56. A bushing 64 fixedly secured in a second end of first rod 58 freely receives the upper first threaded end of a second rod 66 having a nut fastener 68 thereon. A knurled second knob 70 is threadingly secured to first end of second rod 66, also inadvertently prevent second rod 66 from being separated from first rod 58, when extracting a valve lifter 36.

Referring now to FIG. 4 and the lower right portion of FIG. 2, the opposite and second end of second rod 66 is provided with a valve lifter clamp socket 72 that is threaded onto rod 66, the rod 66 being threaded into the threaded end opening 74 of clamp socket 72. A pair of spaced apart and projecting bottom ear members 76 are integrally attached to clamp socket 72, and receive a clamp screw 78 that serves to close ear members 76 towards each other, and firmly hold clamp socket 72 to an end of a typical valve lifter 36, so as to enable the entire tool assembly 10 to pull valve lifter 36 out of its opening 38. An additional separating screw 96 is provided to spread ears 76, should a valve lifter be come difficult to remove from the clamp. This screw is threaded only into ear 98 and serves to spread the ears apart from each other when tightened.

Looking now at FIG. 7, a short adapter clamp socket 80 is also illustrated and includes all of the same elements described of 72, the only exception being, that this clamp is of a shorter length with less depth. The function of this clamp socket 80 is the same as described of clamp socket 72, but its shorter length allows access in cramped spaces of some engines where the long clamp socket 72 will not fit.

Referring now to FIGS. 5 and 6, a push rod clamp socket 82 of tool 10 is shown to include bottom ear members 84 having a clamp screw 86 therein, for tightening against an engine push rod 88 to extract push rod 88. Clamp socket 82 is further provided with a second clamp screw in its body that is designed to engage with the outer periphery of the push rod 88, for further gripping force.

In use, tool 10 is first attached to engine 22 by bolt fasteners 18 being placed into the brackets 14 and threaded into the openings 20 of the engine 22. Openings 22 are always available because they are the thread bores which are used to removably secure valve cover which normally protect the area of the engine, which must be exposed in order for a mechanic to gain access to the valve assemblies. After the above, the first mounting bar 12 is slid to a position wherein the second rod 66 of the tool 10 will be aligned with a valve lifter 36, so as to permit engagement and tightening a clamp socket 72 to the exposed end of the valve lifter 36 to be extracted. When the above is accomplished, the operator rotates nut 68 and tightens it against bushing 64 to cause the rod 66 to elevate and thus extract the lifter 36 from the engine 22.

It shall be recognized that tool 10 is so designed, as to enable pivotal motion of second bar 42, rotation of sleeve 54, rotation and sliding of first rod 58, as well as sliding of mounting bar 12, for complete access to all of the valve lifters 36 or push rods 88 of any engine 22 that they are to be extracted from.

When extracting push rods 88, the push rod clamp socket 82 is employed by threading it onto the bottom end of the second rod 66. Clamp socket 82 is placed over the end of a push rod 88 and the screws 86 and 90 are both tightened. After the above, the extraction of the push rod 88 is effected in the same manner as was heretofore described of a valve lifter 36. Naturally push rods must obviously be removed first in order to gain access for valve lifter removal with the tool.

As a practical matter it should be noted that only the valve cover and rocker arm assembly need be removed because the tool allows for the removal of the valve lifters and push rods while the engine head remains bolted to the engine block.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An automotive valve lifter and push rod extractor tool for engines which comprises:

(a) a mounting bar;

(b) means for removably securing said mounting bar to said engine;

(c) a second bar;

(d) means for pivotally securing said second bar to said mounting bar;

(e) a post;

(f) means for fixedly adjusting the position of said post on said second bar;

(g) a mounting sleeve;

(h) means for rotatively securing said mounting sleeve on said post;

(i) a first rod;

(j) means for rotatively and slideably coupling said first rod to said mounting sleeve;

(k) a second rod;

(l) means for slideably coupling said second rod to said first rod;

(m) a clamp socket;

(n) means for fixedly securing said clamp socket to said second rod;

(o) means for temporally securing said clamp socket to and engine component to be extracted; and (p) means for applying a pulling force to said second rod whereby said engine component is extracted.

2. An automotive valve lifter and push rod extractor tool for engines as recited in claim 1, wherein means for removeably securing said mounting bar to said engine is at least one screw which passes through an opening in said mounting bar and is received in preexisting bore in said engine.

3. An automotive valve lifter and push rod extractor tool for engines as recited in claim 1, wherein means for removeably securing said mounting bar to said engine is a plurality of screws which passes through at least one elongated slot in said mounting bar and are threadingly received in preexisting thread bores in said engine.

4. An automotive valve lifter and push rod extractor tool for engines as recited in claim 1, wherein means for pivotally securing said second bar to to said mounting bar are screws which pass through a pair of spaced apart projections and are threadingly received in a corresponding pair of ears.

5. An automotive valve lifter and push rod extractor tool for engines as recited in claim 1, wherein means for fixedly adjusting the position of said post on said second bar is at least one bore in said second bar which receives a threaded stud fixedly attached to said post and a nut fastener which secures said thread stud to said second bar.

6. An automotive valve lifter and push rod extractor tool for engines as recited in claim 1, wherein means for rotatively securing said mounting sleeve on said post is a shank which is an integral part of said post and which freely fits within an opening in said mounting sleeve.

7. An automotive valve lifter and push rod extractor tool for engines as recited in claim 5, wherein said second rod has an end thread which cooperates with a thread bore in said clamp socket and this is the means for fixedly securing said clamp socket to said second rod.

8. An automotive valve lifter and push rod extractor tool for engines as recited in claim 1, wherein means for applying a pulling force to said second rod is a nut fastener with internal threads which matingly cooperate with external threads integrally formed along a portion of said second rod, and a bushing fixedly secured in a end of first rod which said nut fastener bears against when tightened.

* * * * *